(12) United States Patent
Chen et al.

(10) Patent No.: US 7,564,567 B2
(45) Date of Patent: Jul. 21, 2009

(54) SENSOR FOR MEASURING A VIBRATING SURFACE OBSCURED FROM VIEW

(75) Inventors: Jerry C. Chen, Lexington, MA (US); Sumanth Kaushik, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 85 days.

(21) Appl. No.: 11/626,966

(22) Filed: Jan. 25, 2007

(65) Prior Publication Data

US 2008/0074674 A1    Mar. 27, 2008

Related U.S. Application Data

(60) Provisional application No. 60/847,066, filed on Sep. 25, 2006.

(51) Int. Cl.
*G01B 11/02* (2006.01)
(52) U.S. Cl. ..................................... 356/502
(58) Field of Classification Search ............... 356/35.5, 356/496, 498, 502
See application file for complete search history.

(56) References Cited

U.S. PATENT DOCUMENTS

| 4,554,836 | A | 11/1985 | Rudd |
| 6,330,065 | B1 | 12/2001 | Hill |
| 6,665,075 | B2 | 12/2003 | Mittleman et al. |
| 7,382,465 | B1 * | 6/2008 | Pepper ........................ 356/485 |
| 2003/0007156 | A1 | 1/2003 | De Groot et al. |
| 2003/0128917 | A1 | 7/2003 | Turpin et al. |
| 2005/0237533 | A1 * | 10/2005 | Lal et al. ..................... 356/486 |

OTHER PUBLICATIONS

Belansky, Richard H. et al.; "Laser Doppler volecimetry using a bulk optic Michelson interferometer: A student laboratory experiment"; American Association of Physics Teachers; Nov. 1993; vol. 61, No. 11; pp. 1014-1019.

Courtial, K. et al.; "Measurement of the Rotational Frequency Shift Imparted to a Rotating Light Beam Possessing Orbital Angular Momentum"; The American Physical Society; Physical Review Letters; Apr. 13, 1998; vol. 80, No. 15; pp. 3217-3219.

(Continued)

*Primary Examiner*—Michael A Lyons
(74) *Attorney, Agent, or Firm*—Guerin & Rodriguez, LLP; William G. Guerin

(57) ABSTRACT

Described are a sensor and a method for measuring a vibration of a surface obscured from view. The sensor includes a narrowband source of a terahertz beam, a beamsplitter, a beam combiner and a terahertz detector. The beamsplitter splits the terahertz beam into a sample beam for irradiating the surface and a reference beam. The beam combiner combines the sample beam scattered from the surface and the reference beam. The terahertz detector generates an electrical signal based on a modulation of the power of the combined beams due to the vibrating surface. The electrical signal indicates a characteristic of the surface vibration. Homodyne or heterodyne detection can be utilized. Advantageously, the sensor can see surfaces that are covered, concealed or otherwise obscured behind optically opaque materials, including plastic, cloth, foam, paper and other materials. Thus the sensor has a wide variety of applications where conventional vibrometers are not practical.

17 Claims, 7 Drawing Sheets

OTHER PUBLICATIONS

Courtial, J. et al.; "Rotational Frequency Shift of a Light Beam"; The American Physical Society; Physical Review Letters; Nov. 30, 1998; vol. 81, No. 22; pp. 4828-4830.

Polster, H. et al.; "New Developments in Interferometry"; Mar. 1969; Applied Optics; vol. 8, No. 3; pp. 521-556.

Dholakia, K.; "An experiment to demonstrate the angular Doppler effect on laser light"; American Association of Physics Teachers; Nov. 1998; vol. 66, No. 11; pp. 1007-1010.

Freschi, A. et al.; "Laser interferometric characterization of a vibrating speaker system"; Nov. 2003; American Association of Physics Teachers; vol. 71, No. 11; pp. 1121-1126.

Kothiyal, M. et al.; "Optical frequency shifter for heterodyne interferometry using counterrotating wave plates"; Aug. 1984; Optics Letters; vol. 9, No. 8; pp. 319-321.

Krishnamurthy, S. et al.; "Characterization of thin polymer films using terahertz time-domain interferometry"; Aug. 6, 2001; American Institute of Physics; Applied Physics Letters; vol. 79, No. 6; pp. 875-877.

Johnson, J. et al.; "Interferometric Imaging With Terahertz Pulses"; IEE Journal on Selected Topics in Quantum Electronics; vol. 7, No. 4; Jul./Aug. 2001; pp. 592-599.

Perry, C. et al.; "Solid State Studies by Means of Fourier Transform Spectroscopy"; Jul. 1996; Applied Optics; vol. 5, No. 7; pp. 1171-1178.

Sommargren, G.; "Up/down frequency shifter for optical heterodyne interferometry"; Journal of the Optical Society of America; Letters to the Editor; vol. 65, No. 8; Aug. 1975; pp. 960-968.

Vystavkin, A. et al.; "Submillimeter Spectroradiometers with n-InSb Detectors"; IEE Transactions on Microwave Theory and Techniques; Dec. 1974; vol. MTT-22, No. 12; pp. 1041-1046.

International Search Report for PCT/US07/78710 dated Apr. 11, 2008; 2 pages.

* cited by examiner

SENSOR FOR MEASURING A VIBRATING SURFACE OBSCURED FROM VIEW

RELATED APPLICATION

This application claims the benefit of the earlier filing date of U.S. Provisional Patent Application Ser. No. 60/847,066, filed Sep. 25, 2006, titled "Terahertz Interferometer that Senses Vibration Behind Barriers," the entirety of which is incorporated herein by reference.

GOVERNMENT RIGHTS IN THE INVENTION

This invention was made with United States government support under Contract No. FA8721-05C-0002 awarded by the United States Air Force. The government may have certain rights in the invention.

FIELD OF THE INVENTION

The present invention relates generally to the measurement of vibrations. More particularly, the invention relates to sensing a vibrating surface obscured from view using terahertz radiation.

BACKGROUND OF THE INVENTION

Measurements of surface vibrations can be made according to a wide variety of techniques. For example, accelerometers can be attached to the surface to be measured to generate an electrical signal responsive to the vibration. In many applications accelerometer measurements and other forms of contact measurements are not practical. The surface to be measured may be damaged or destroyed if a contact device is attached. The weight and stiffness of the device may dampen the vibration, and the vibration measurement is limited to the region on the surface where the device is attached. In addition, contact measurements are not feasible if the surface to be measured is located in an inaccessible space.

Optical vibrometers are often used in applications where physical contact or object location make contact measurements impractical. Typically optical vibrometers use lasers to detect a Doppler frequency shift of light scattered from the surface to characterize the vibration. Examples of non-contact applications for this technique include measurements of the vibration of motors, audio speakers, brakes, hard disk drives, microelectromechanical systems (MEMS), engines, motors, fans and various automotive and aircraft components, and measurements of seismic disturbances. These measurements are limited to applications where there is a direct optical path between the vibrometer and the surface.

What is needed is a sensor system that overcomes the problems and limitations of the techniques described above. The present invention satisfies this need and provides additional advantages.

SUMMARY OF THE INVENTION

In one aspect, the invention features a sensor for measuring a vibration of a surface. The sensor includes a narrowband source of a terahertz beam, a beamsplitter, a beam combiner and a terahertz detector. The beamsplitter splits the terahertz beam into a sample beam for irradiating the surface and a reference beam. The beam combiner combines the sample beam scattered from the surface and the reference beam. The terahertz detector receives the combined sample beam and reference beam and generates an electrical signal based on a modulation of a power of the combined sample beam and reference beam. Modulation of the power is responsive to the vibration of the surface and the electrical signal is indicative of a characteristic of the vibration of the surface.

In another aspect, the invention features a sensor for measuring a vibration of a surface. The sensor includes a narrowband source of a terahertz beam, a beamsplitter, a beam combiner, a terahertz frequency shifter, a terahertz detector and a processor module. The terahertz frequency shifter is disposed in a path of the sample beam or the reference beam. The beamsplitter splits the terahertz beam into a sample beam for irradiating the surface and a reference beam. The beam combiner combines the sample beam scattered from the surface and the reference beam. The terahertz detector receives the combined sample beam and reference beam, and generates an electrical signal based on a modulation of a power of the combined sample beam and reference beam. The electrical signal is responsive to the vibration of the surface and has an offset frequency according to a frequency shift imparted by the terahertz frequency shifter. The processor module is in communication with the terahertz detector and produces an electrical signal indicative of a displacement of the surface in response to the electrical signal generated by the terahertz detector.

In still another aspect, the invention features a method for measuring a vibration of a surface obscured from view. A terahertz beam is split into a sample beam for irradiating the surface and a reference beam. After scattering from the surface, the sample beam is combined with the reference beam. An electrical signal is generated based on a modulation of a power of the combined sample beam and reference beam in response to the vibration of the surface. The electrical signal is demodulated to generate a signal indicative of a characteristic of the vibration of the surface.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

Figure 1:
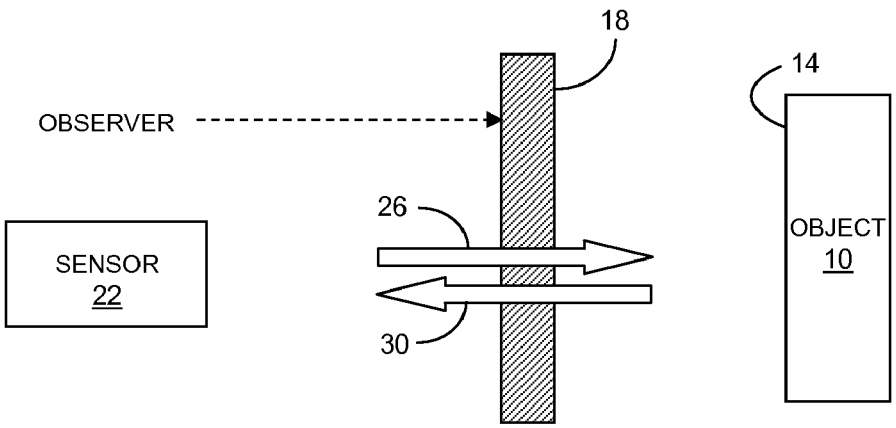
FIG. 1 shows an application for which the sensor of the present invention can be employed.

In brief overview, the invention relates to a sensor for measuring a vibration of a surface obscured from view. The sensor includes a narrowband source of a terahertz beam, a beamsplitter, a beam combiner and a terahertz detector. The beamsplitter splits the terahertz beam into a sample beam for irradiating the surface and a reference beam. The beam combiner combines the sample beam scattered from the surface and the reference beam. The combined beams are received at the terahertz detector which generates an electrical signal based on a modulation of the power of the combined beams in response to the vibrating surface. The electrical signal is indicative of a characteristic of the vibration of the surface. The sensor components can be arranged in a Michelson or a Mach-Zehnder interferometer configuration. The beamsplitter and the beam combiner can be integrated as a single optical element such as the beamsplitter/combiner of a Michelson interferometer.

Terahertz radiation includes radiation in the frequency range between radio frequency (RF) and optical frequencies. As used herein, terahertz radiation includes radiation having a frequency between 300 GHz and 3 THz, or a wavelength between 1 mm to 100 µm. A "narrowband source of a terahertz beam," as used herein, means a source of a beam of terahertz radiation having a spectral width that is sufficiently small (e.g., tens of megahertz or less) so that any mismatch in the path lengths of the sample beam and reference beam of the sensor has an insignificant effect on sensor operation. In contrast to the sensor of the invention, terahertz imaging systems use broadband sources in which variations in the received optical power in the combined beams occurs only over a small range (i.e., on the order of a wavelength) about a zero path difference between the beams. Moreover, the imaging resolution of such systems improves with increasing bandwidth. Thus sources of radiation suitable for terahertz imaging systems are not suitable for the radiation source of the sensor of the present invention.

The sensor can be constructed from commercial components and operated at room temperature. Advantageously, the sensor can see surfaces that are covered, concealed or otherwise obscured behind optically opaque materials such as plastic, cloth, foam, paper and materials commonly used in luggage. The sensor emits non-ionizing radiation and is eye-safe for most applications. Thus the sensor can be employed for testing and security applications for which conventional vibrometers are not feasible. Some specific applications include biometric measurements, speech recognition, nondestructive testing of covered objects and vehicle signature detection. Biometric measurements include, for example, the determination of heartbeat through clothing. An example of a speech recognition application is the examination of the human vocal tract at standoff distances. Vehicle signature detection includes, for example, determining vehicle vibration signatures for different types of vehicles (e.g., helicopters, aircraft, automobiles and tanks) concealed from view by natural or artificial barriers such as a tarp.

FIG. 1 illustrates an application for which the sensor of the present invention can be employed. An object 10 having a vibrating surface 14 is located behind an optically opaque barrier 18. An observer on the opposite side of the barrier 18 cannot see the object 10. A sensor 22 constructed in accordance with the principles of the invention is disposed such that the barrier 18 interrupts a direct view of the object 10. The sensor emits a sample beam 26 of terahertz radiation which at least partially penetrates the barrier to irradiate the surface 14. A portion 30 of the terahertz radiation scattered from the surface 14 penetrates the barrier 18 in a reverse direction and is received at the sensor 22. The sensor 22 produces an amplitude modulated electrical signal or phase modulated electrical signal responsive to the vibration of the surface 14. The electrical signal can be processed to provide specific useful data to an operator such as tone frequencies and amplitudes for the vibrating surface. More complex processing can be implemented in processing to generate other data. For example, the sensor can include an array of detectors to enable vibrations from different parts of the surface 14 to be measured simultaneously and mapped spatially.

Figure 2:
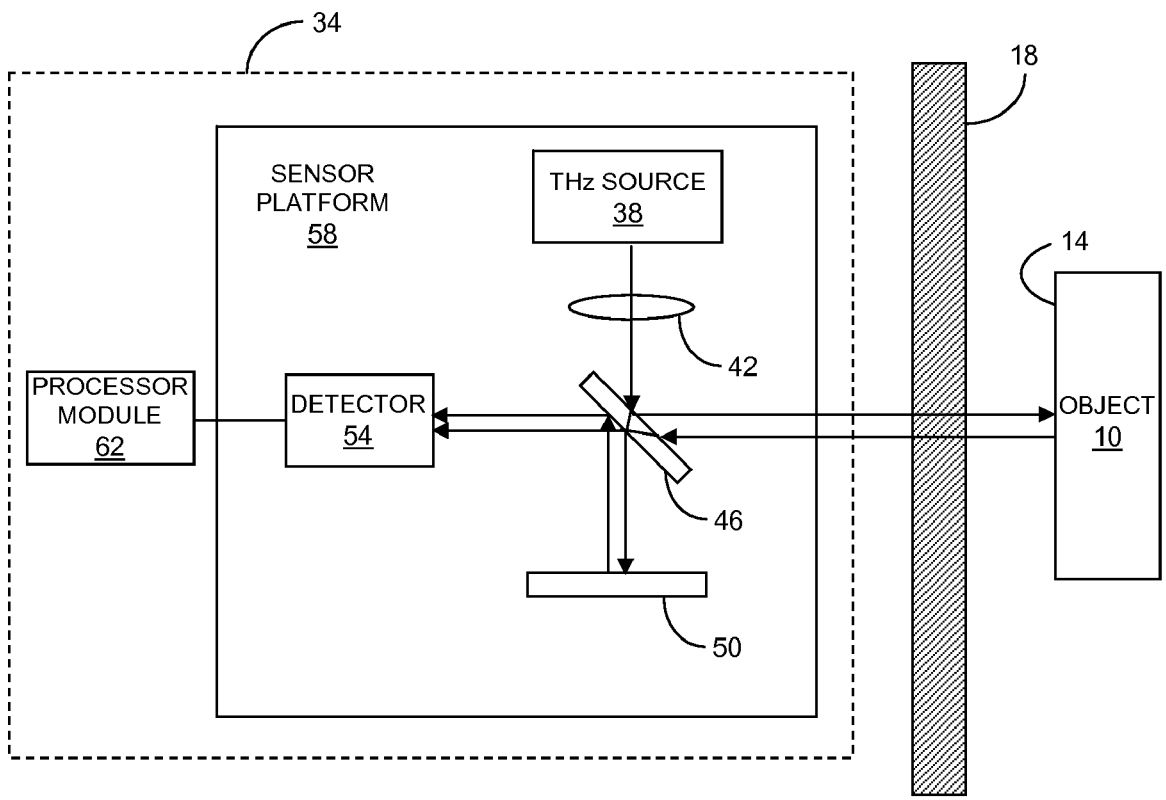
FIG. 2 shows an embodiment of a sensor for measuring a vibration of a surface according to the invention.

FIG. 2 shows in more detail an embodiment of a sensor 34 for measuring a vibration of a surface obscured from view according to the invention. The illustrated embodiment shows the sensor 34 having a homodyne detection configuration. Sensor components include a terahertz source 38, beamforming optical module (e.g., polyethylene lens) 42, beamsplitter 46, mirror 50 and a detector 54 responsive to incident terahertz radiation. The sensor components are arranged in a Michelson interferometer configuration on a sensor platform 58. Preferably, the sensor platform 58 is mechanically stiff and has a small coefficient of thermal expansion. The components are securely fastened or bolted to the platform 58. The sensor 34 also includes a processor module 62 in communication with the terahertz detector 54. In some embodiments the processor module 62 analyzes the detector output, determines if the interferometer is biased at its most linear point, and moves the reference mirror 50 to maintain maximum linearity. Communication can occur between the terahertz detector 54 and the processor module 62 through an electrical cable or optical fiber. The processor module 62 can be mounted to the sensor platform 58 or can be remotely located for operator convenience and accessibility.

Sensor components can be procured through commercial vendors. In one embodiment the terahertz radiation source 38 is a backward wave oscillator (e.g., model no. QS-500 ov80 (generating approximately 3 mW at 615 GHz (488 µm) with a 60 MHz linewidth) available from Microtech Instruments, Inc. of Eugene, Oreg.). In other embodiments the terahertz radiation source 38 is a quantum cascade laser, a direct multiplied source (using millimeter wave sources multiplied up to terahertz frequencies) or a CO2 laser-pumped gas cell. The beamforming optical module 42 can be a lens, which can be fabricated, for example, from a polyethylene material to appropriate specifications, i.e., diameter and focal length, for collimation of the terahertz radiation. Other lens materials include, but are not limited to, silicon, diamond, IR grade fused silica, and plastic. The terahertz radiation can also be collimated and shaped by metal mirrors. As needed, beamforming can also be performed between the detector 54 and beamsplitter 46, between the beamsplitter 46 and mirror 50, and between the beamsplitter 46 and the barrier 18. In one embodiment the beamsplitter 46 is a 0.001 in. thick Kapton film (available from Bruker Optics of Billerica, Mass.) having an approximate terahertz transmission of 70%. In an alternative embodiment, the beamsplitter 46 is a high resistivity silicon window (available from TYDEX of St. Petersburg, Russia) which provides a spectrally flatter transmission when compared to the Kapton film embodiment. In another alternative embodiment, the beamsplitter 46 is a 2×2 fiber or waveguide coupler. The mirror 50 can be fabricated as a near optical quality flat surface on a material such as aluminum or gold. If beamforming is needed, the mirror 50 can have a curved surface. The mirror 50 is preferably mounted on a three-axis translation stage for ease of alignment and adjustment. Preferably, the translation stage is motorized to more easily maintain optimal linearity and bias as the distance to the object 10 fluctuates. In one embodiment the terahertz detector 54 is a Golay cell available from Microtech Instruments of Eugene, Oreg. and QMC Instruments of Cardiff, UK. In other embodiments the terahertz detector 54 is a pyroelectric detector available, for example, from Goodrich of Ithaca, N.Y. and Danbury, Conn. or a liquid helium cooled bolometer available from IR Labs of Tucson Ariz. and QMC Instruments of Cardiff, UK.

Figure 3:
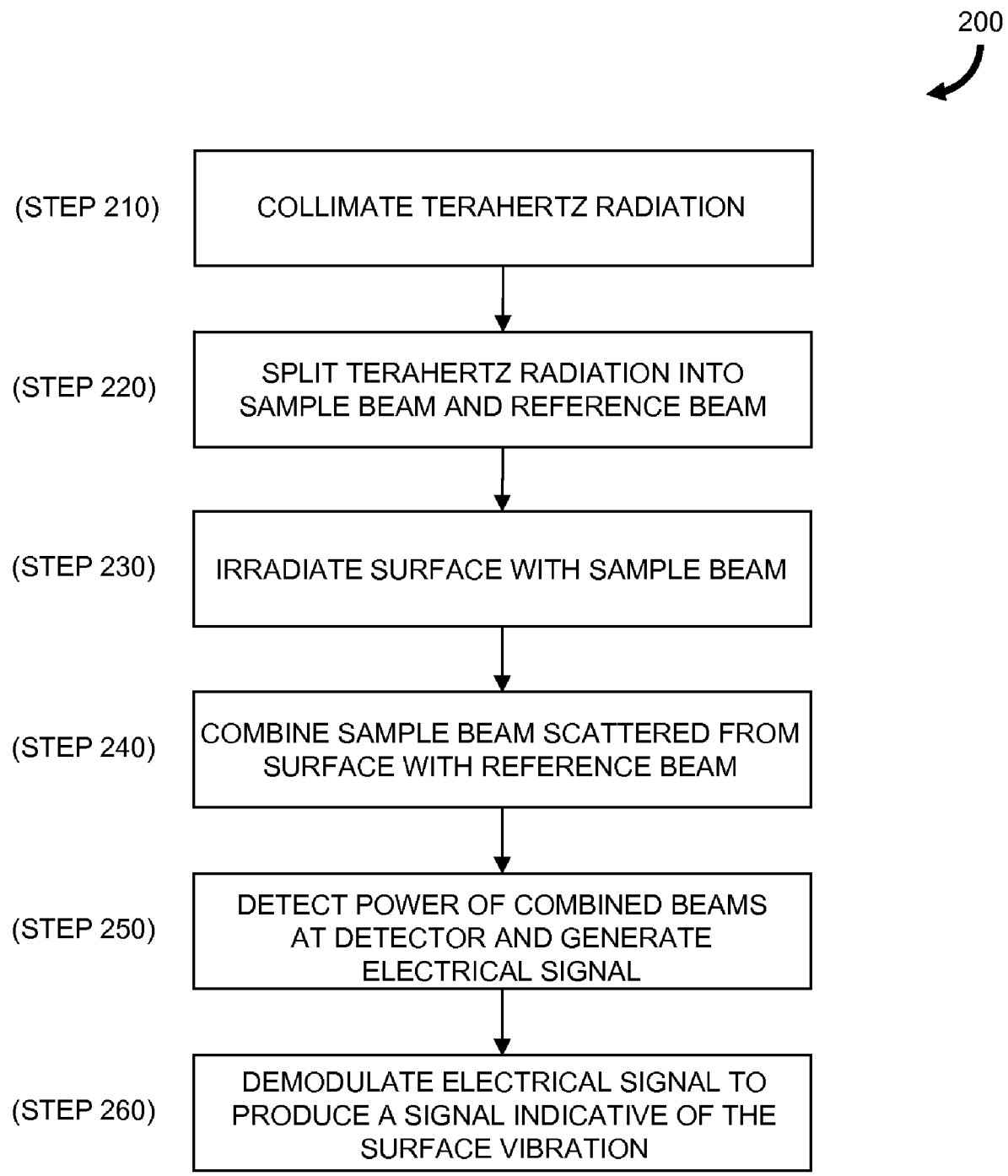
FIG. 3 is a flowchart representation of an embodiment of a method for measuring a vibration of a surface obscured from view according to the invention.

FIG. 3 is a flowchart representation of a method 200 for measuring a vibration of a surface obscured from view. Referring to both FIG. 2 and FIG. 3, during sensor operation a portion of the terahertz radiation emitted from the source 38 is received and collimated (step 210) by the lens 42. Some sources directly provide a collimated beam so step 210 is not necessary in some alternative embodiments. The collimated beam is incident on the beamsplitter 46 and is split (step 220) with a portion of the beam transmitted as a reference beam to the mirror 50 and reflected back to the beamsplitter 46. Most of the remaining portion of the collimated beam that is incident on the beamsplitter is reflected as a sample beam through the intervening barrier 18 to irradiate (step 230) the vibrating surface 14. The terahertz radiation that is incident on the surface 14 is scattered with a portion of the scattered radiation propagating in a reverse direction through the barrier 18 to the beamsplitter 46. Although only a portion of the beam energy is received back at the beamsplitter, the phrase "sample beam" as used herein also refers to the scattered terahertz radiation propagating in reverse fashion through the interferometer configuration. A portion of the incident sample beam is transmitted through the beamsplitter 46 and is effectively combined (step 240) with a portion of the returned reference beam that is reflected from the beamsplitter 46.

The received power $P_{RX}$ at the terahertz detector 54 can be expressed as $$P_{RX} = PRT(1+L^2+2L\cos(\phi_1-\phi_2))$$

where P is the power of the radiation in the collimated beam from the source 38, R is the fractional reflected power from the beamsplitter 46, T is the fractional transmitted power through the beamsplitter 46, L is the fractional power transmitted through the barrier 18 in one pass, and $\phi_1-\phi_2$ is the phase difference between the interferometer arms, i.e., between the sample and reference beams. The phase difference can be expressed as $$\phi_1 - \phi_2 = \phi_{DC} + 2k\sum_i D_i \sin(2\pi f_i t)$$

where $f_i$ is a vibration frequency, $D_i$ is the maximum displacement of the vibrating surface from its nominal position at the frequency $f_i$, k is the wave vector and $\phi_{DC}$ is the static (i.e., "DC") phase difference. If $\phi_{DC}/\pi$ is a half integer, i.e., if the static phase difference $\phi_{DC}$ corresponds to the quadrature point or "midpoint" between the minimum and maximum values of the received power $P_{RX}$, small surface displacements result in approximately linear changes in the received power $P_{RX}$. At this maximum linearity or half power point, the received power $P_{RX}$ is approximated as $$P_{RX} = PRT\left(1+L^2+4Lk\sum_i D_i \sin(\omega_i t)\right) \text{ or}$$

$$P_{RX} = PRT\left(1+L^2-4Lk\sum_i D_i \sin(\omega_i t)\right),$$

the particular approximation depending on whether the half integer is even or odd.

The terahertz detector 54 generates (step 250) an electrical signal that is responsive to the received power $P_{RX}$. The processor module 62 receives and demodulates (step 260) the electrical signal, and can perform other signal processing functions such as bias control, filtering and signal integration. In one embodiment, the measurement data are normalized according to the responsivity of the terahertz detector 54. This technique is especially useful if the vibrations frequencies to be detected are in a frequency range where the responsivity of the terahertz detector 54 decreases rapidly with increasing modulation frequency. For example, this "pre-emphasis" technique permits a Golay cell having a 3 dB frequency response of tens of hertz to be used to measure vibrations at frequencies of a few hundred hertz.

If the object 10 being monitored moves towards or away from the sensor 34, the static phase difference $\phi_{DC}$ changes. In one embodiment, the processor module 62 includes a stabilization module (e.g., a control circuit) to ensure that $\phi_{DC}/\pi$ remains at a half integer value. For example, the stabilization module can control the linear position of the mirror 50 to compensate for the change that would otherwise occur for the path difference between the reference and sample beams caused by movement of the object 10, thereby maintaining a bias at the quadrature point. The signal from the detector 54 is monitored to ascertain and set an appropriate bias or phase where linearity is maximum so the analog signal is not distorted. The mirror positions where the output signal from the detector 54 is at maximum and at a minimum are determined. The half power point is midway between these two mirror positions. Alternatively, a known vibration can be introduced at the reference mirror 50 and the DC bias point is set where the second harmonic of the known vibration is zero to achieve maximum linearity.

The vibration measurement data can be presented to a user in a variety of forms. For example, graphical and numerical displays of surface velocity as a function of frequency and surface displacement as a function of frequency can be provided. Vibration data can also be plotted as a function of time and position.

Figure 4:
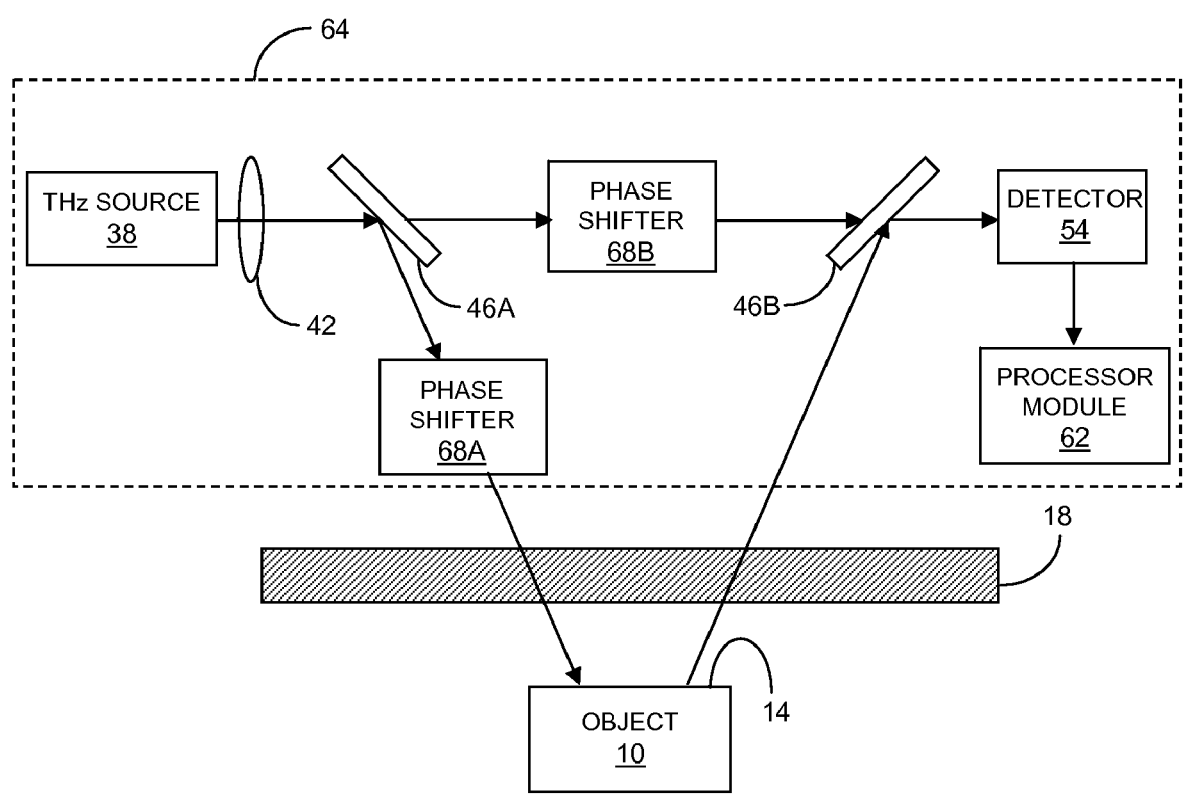
FIG. 4 illustrates another embodiment of a sensor for measuring a vibration of a surface according to the invention.

FIG. 4 shows another embodiment of a sensor 64 for measuring a vibration of a surface obscured from view according to the invention. The illustrated embodiment shows the sensor 64 in a homodyne detection configuration. Sensor components are arranged in a Mach-Zehnder interferometer configuration and include a terahertz source 38, beamforming optical module 42 and detector 54 similar to corresponding sensor components depicted in FIG. 2. The sensor 64 also includes a beamsplitter 46A to split the terahertz beam into a sample beam and a reference beam, and a beamsplitter 46B to combine the sample beam scattered from the surface 14 of the object 10 and the reference beam. A phase shifter 68A and 68B is disposed in the sample beam and the reference beam, respectively, to provide for adjustment of the relative phase between the reference and sample beams.

Figure 5:
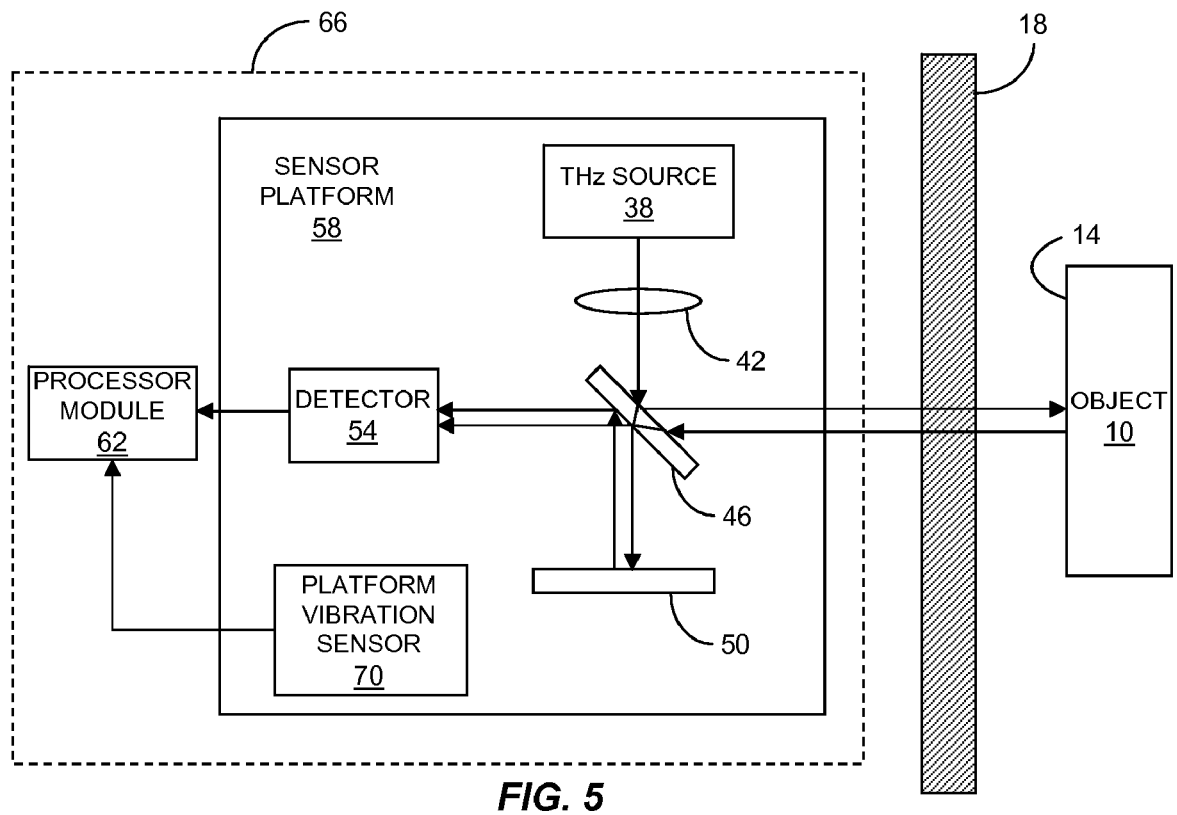
FIG. 5 illustrates an embodiment of a sensor according to the invention which includes a platform vibration sensor to remove the effects of platform vibration from sensor measurement data.

Vibration of the sensor 34 can limit its usefulness in measuring the vibration of the surface 14 of the object 10. In one embodiment of a sensor 66 in a homodyne detection configuration as shown in FIG. 5, a platform vibration sensor 70 is mounted to the sensor platform 58. The platform vibration sensor 70 can be, for example, an accelerometer or a geophone. The measured platform vibration is subtracted from the raw vibration measurement of the surface 14 to yield the actual surface vibration.

Figure 6:
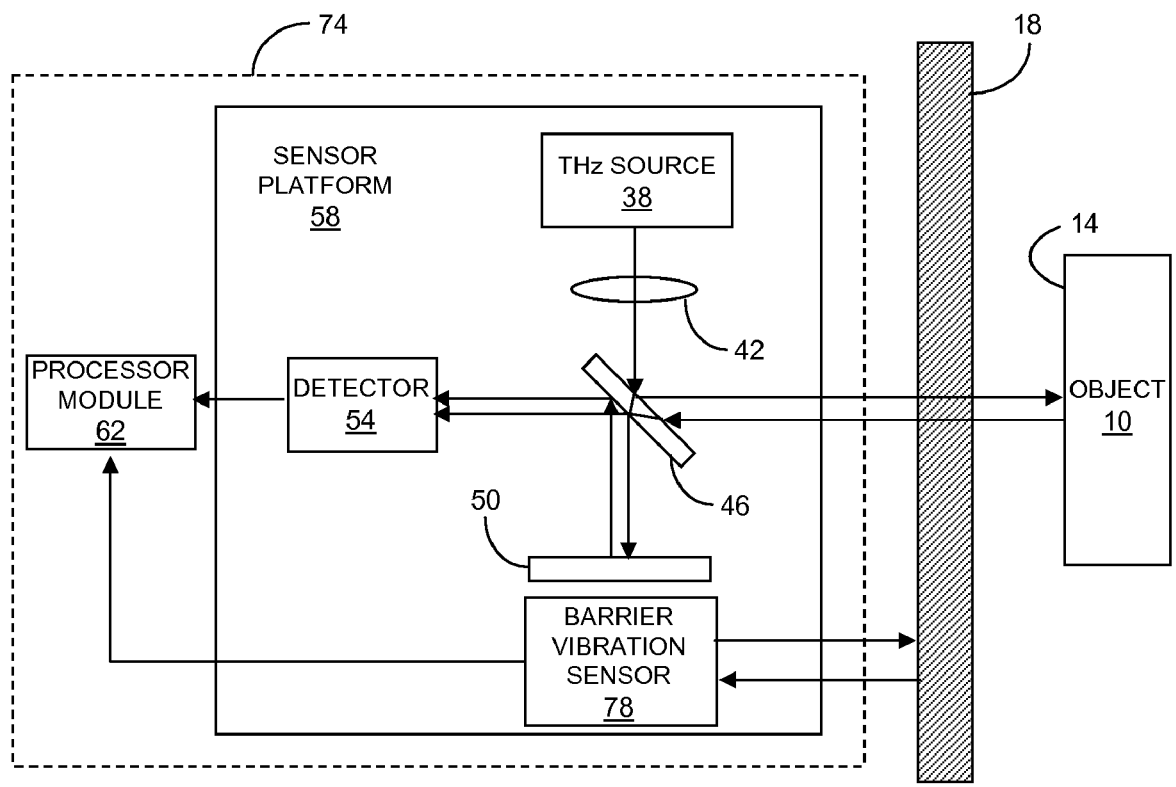
FIG. 6 illustrates another embodiment of a sensor according to the invention which includes a barrier vibration sensor to remove the effects of platform vibration from the sensor measurement data.

In an alternative embodiment of a sensor 74 shown in FIG. 6, a barrier vibration sensor 78 is mounted to the sensor platform 58. The barrier vibration sensor 78 operates at a wavelength that cannot penetrate the barrier 18. For example, the barrier vibration sensor 70 can be a laser vibrometer. The components of the sensor 74 and the barrier vibration sensor 78 share the same platform 58 so the relative vibration between the components of the sensor 74 and the barrier vibration sensor 78 is zero. Subtraction of the measured barrier vibration from the measured vibration of the surface 14 of the object 10 yields the vibration of the surface 14 relative to the barrier 18.

Figure 7:
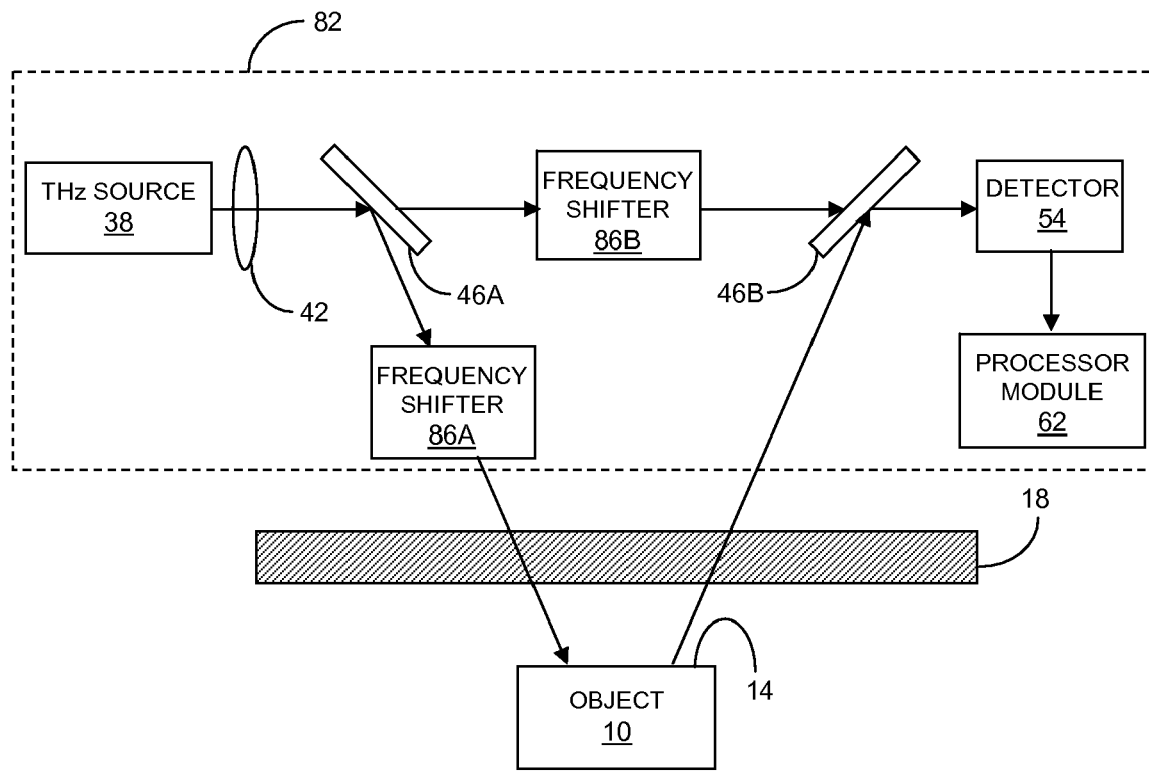
FIG. 7 illustrates another embodiment of a sensor for measuring a vibration of a surface according to the invention.

FIG. 7 shows another embodiment of a sensor 82 for measuring a vibration of a surface obscured from view according to the invention. The illustrated embodiment employs a heterodyne detection configuration with the sensor components arranged in a Mach-Zehnder interferometer configuration. Heterodyne detection results in improved sensitivity as 1/f detector noise is significantly reduced. In addition, heterodyne detection is less sensitive to object motion towards or away from the sensor 82.

The sensor 82 includes a first terahertz frequency shifter 86A disposed in the sample path of the interferometer after a first beamsplitter 46A and a second terahertz frequency shifter 86B is disposed in the reference path between the first beamsplitter 46A and a second beamsplitter 46B. The sample beam and reference beam are frequency-shifted by $f_S$ and $f_R$, respectively. In alternative embodiments employing the Mach-Zehnder configuration, only one of the sample beam and the reference beam are frequency-shifted. For the illustrated embodiment the received power $P_{RX}$ at the terahertz detector 54 is proportional to $$\cos(2\pi(f_C + f_S - f_R \pm f_V)t + (\phi_1 - \phi_2))$$

where $f_C$ is the carrier frequency of the terahertz beams, $\phi_1 - \phi_2$ is the phase difference between the interferometer arms and $f_V$ is the Doppler frequency shift imparted by motion of the object 10 and the surface 14. The sign of the Doppler frequency shift is positive or negative if the surface is moving towards or away from the sensor 82, respectively.

Figure 8:
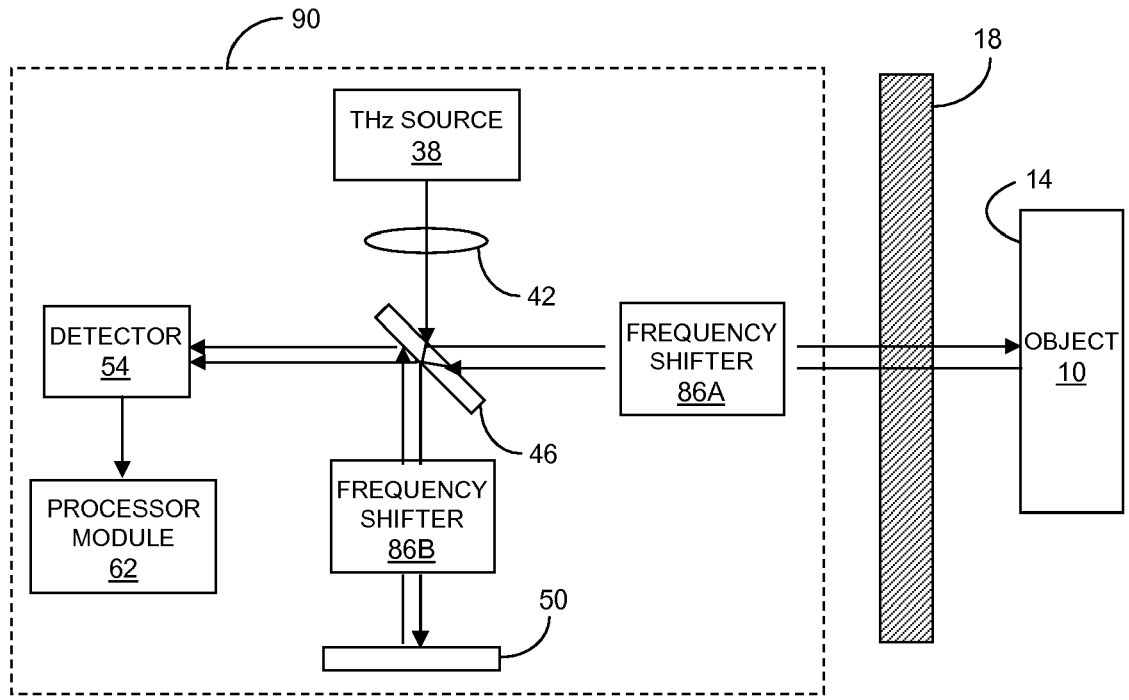
FIG. 8 illustrates another embodiment of a sensor for measuring a vibration of a surface according to the invention.

FIG. 8 shows another embodiment of a sensor 90 that is based on heterodyne detection. The sensor components are arranged in a Michelson interferometer configuration. The sensor 90 includes a first frequency shifter 86A disposed in the sample path of the interferometer after the beamsplitter 46 and a second frequency shifter 86B disposed in the reference path between the beamsplitter 46 and the mirror 50. In alternative embodiments employing the Michelson configuration, only one of the terahertz frequency shifters 86 is included. The sample beam and reference beam are frequency-shifted by $f_S$ and $f_R$, respectively, on each pass through their respective frequency shifters 86. Thus the total frequency shifts for the sample beam and the reference beam on return to the beamsplitter 46 are $2f_S$ and $2f_R$, respectively. In this embodiment the received power $P_{RX}$ at the terahertz detector 54 is proportional to $$\cos(2\pi(f_C + 2f_S - 2f_R \pm f_V)t + (\phi_1 - \phi_2))$$

A narrow linewidth source is advantageous for the embodiments shown in FIG. 7 and FIG. 8. Narrower linewidths yield less phase noise. Moreover, matching the lengths of the sample and reference paths is more important in homodyne detection embodiments than for the heterodyne detection techniques used in the embodiments shown in FIG. 7 and FIG. 8. Minimizing the difference in the path lengths is still beneficial as the path length difference is limited by the coherence length of the source 38. The coherence length for a rectangular spectrum is $c/\Delta f$, where c is the speed of light and $\Delta f$ is the frequency bandwidth of the source 38.

Any of a variety of techniques can be utilized by each frequency shifter 86 to achieve a frequency shift of the terahertz beam. For example, a circularly polarized beam can be passed through a rotating half wave plate to shift the frequency as described in U.S. Pat. No. 4,729,620. A similar technique uses a rotating Dove prism as described in "Rotational Frequency Shift of a Light Beam" by Courtial et al., Physical Review Letters, Volume 81, p. 4828, 1998. The frequency shift is twice the rotation rate of the rotating element or element group. If the terahertz beam is linearly polarized, it can be converted to a circularly polarized beam using a quarter wave plate before the rotating element. The circularly polarized beam is then converted back to a linearly polarized beam using a second quarter wave plate.

Referring again to FIG. 8, the terahertz beam travels through each frequency shifter 86 twice, resulting in a "doubled frequency shift." To obtain only a single frequency shift with a circularly polarized beam, a rotating half wave plate is replaced with a rotating quarter wave plate. The double-pass through the rotating quarter wave plate is equivalent to a single pass through the rotating half wave plate. If the beam is linearly polarized, the quarter wave plate, rotating half wave plate and quarter wave plate combination can be replaced with a single quarter wave plate and a rotating quarter wave plate. Quarter and half wave plates can be fabricated from any material that is birefringent and has low loss at terahertz frequencies. Such materials include quartz, polymers, and semiconductor crystals (e.g., lithium niobate). A preferred material is quartz for its low loss and high birefringence. Alternatively, a dove prism can be used as a broadband half wave plate and a grooved mirror as a quarter wave plate as suggested in the Courtial reference cited above.

Figure 9:
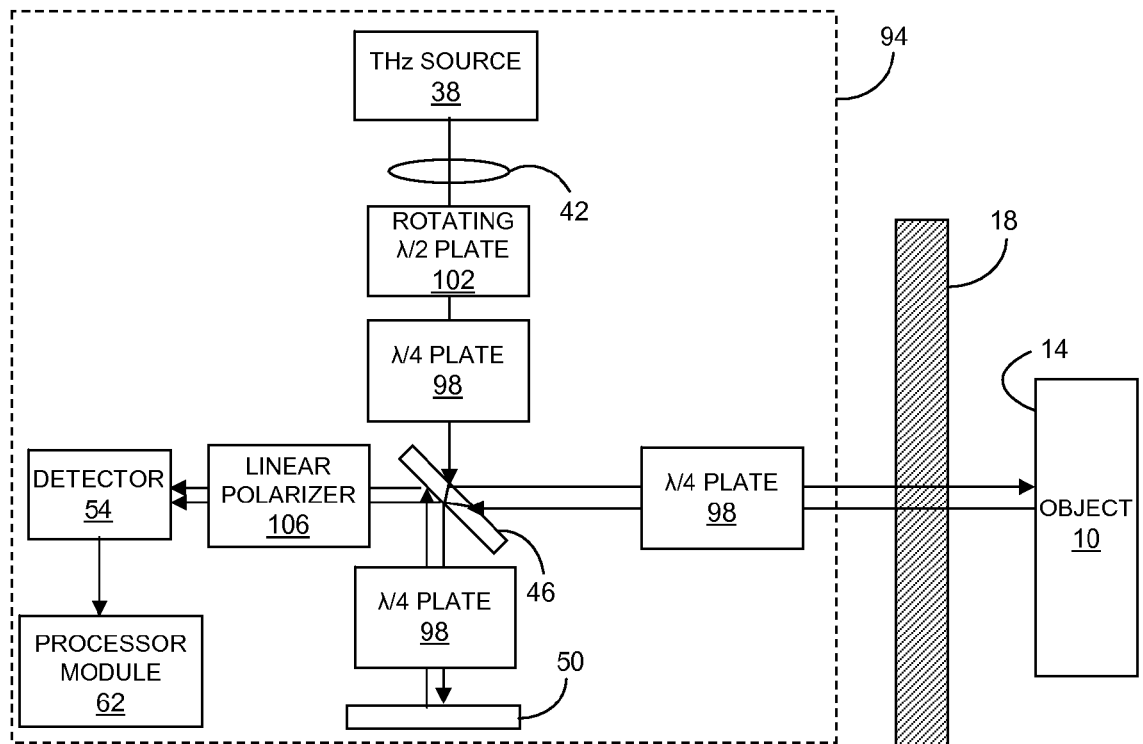
FIG. 9 illustrates another embodiment of a sensor for measuring a vibration of a surface according to the invention.

FIG. 9 shows another embodiment of a sensor 94 according to the invention. The components of the sensor 94 are arranged in a Michelson interferometer configuration and the beamsplitter 46 is a polarization beamsplitter. The sensor 94 includes a quarter wave plate 98 near the beamsplitter 46 and a rotating half wave plate 102 between the source 38 and the quarter wave plate 98. A quarter wave plate 98 is provided in the sample path and in the reference path. For example, if the terahertz source 38 is polarized in linear x, the terahertz power after the beamsplitter 46 but before the linear polarizer 106 is proportional to $1 - \cos(2\pi(4f_M - f_v)t + (\phi_1 - \phi_2))$ in linear x polarization and $1 + \cos(2\pi(4f_M - f_v)t + (\phi_1 - \phi_2))$ in linear y polarization where $f_M$ is the mechanical rotation rate of the half wave plate 102, $4f_M$ is the resultant frequency shift, $f_v$ is the Doppler shift imparted to the beam by the vibrating surface 14, and $\phi_1 - \phi_2$ is the phase difference between the interferometer arms. Depending on the orientation of the linear polarizer 106, all of the x polarization or all of the y polarization can be selected. In another embodiment, a half wave plate is used in place of the linear polarizer 106 so that the sign of the detected power of one polarization component is reversed and the powers of the components are effectively added at the detector 54. In an alternative embodiment, a polarization beamsplitter and a second detector replace the linear polarizer 106 so the polarizations are separately measured. The output signals of the two detectors are then electrically subtracted.

Figure 10:
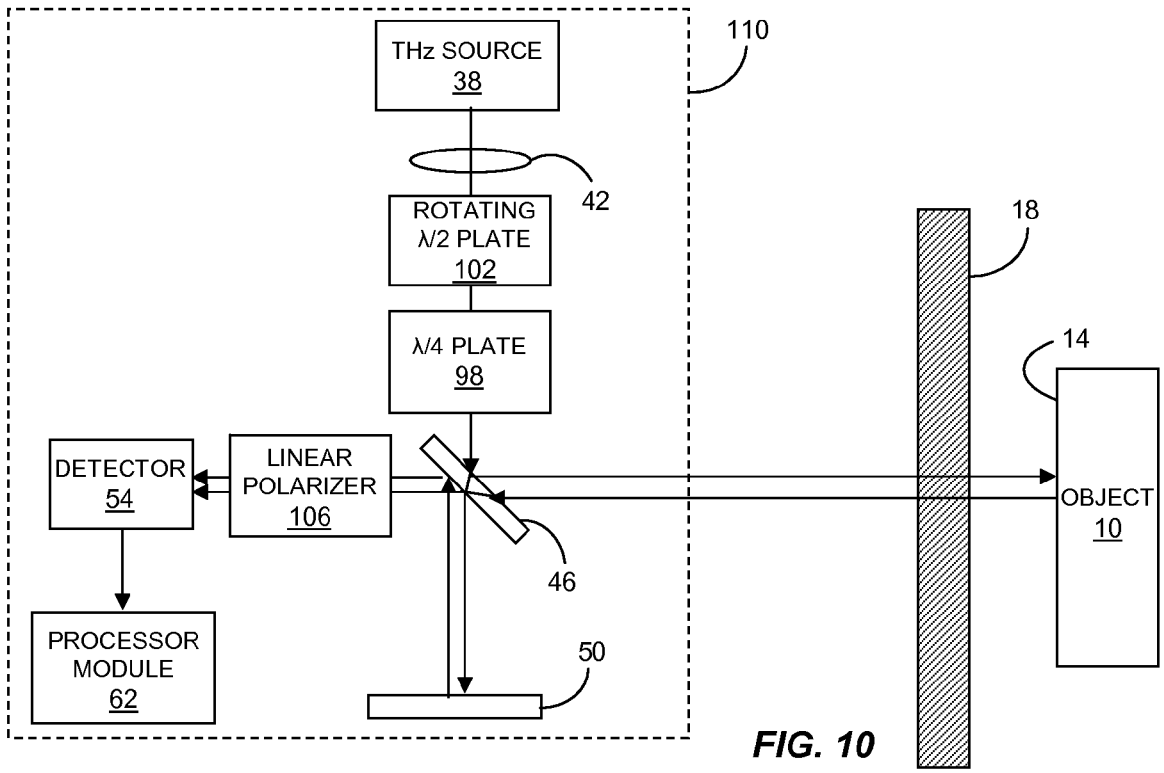
FIG. 10 illustrates another embodiment of a sensor for measuring a vibration of a surface according to the invention.

An alternative embodiment of the sensor 110 is shown in FIG. 10. In contrast to the sensor 94 shown in FIG. 9, the beamsplitter 46 is not polarization-dependent and the two quarter wave plates 98 in the sample beam and reference beam of FIG. 9 are not present. The terahertz power between the beamsplitter 46 and the linear polarizer 106 is proportional to $1-\cos(2\pi(4f_M-f_v)t+(\phi_1-\phi_2))$ in linear x polarization and $1+\cos(2\pi(4f_M-f_v)t+(\phi_1-\phi_2))$ in linear y polarization. The linear polarizer 106 selects either orthogonal component. In another embodiment, a half wave plate is used in place of the linear polarizer 106 so that the sign of the detected power of one of the polarization components is reversed and the powers of the two components are effectively added at the detector 54. In an alternative embodiment, a polarization beamsplitter replaces the linear polarizer 106 to achieve a physical separation of the two polarizations. Each of the separated beams is detected by a terahertz detector and the electrical signal from one of the detectors is subtracted from the electrical signal of the other detector.

Figure 11:
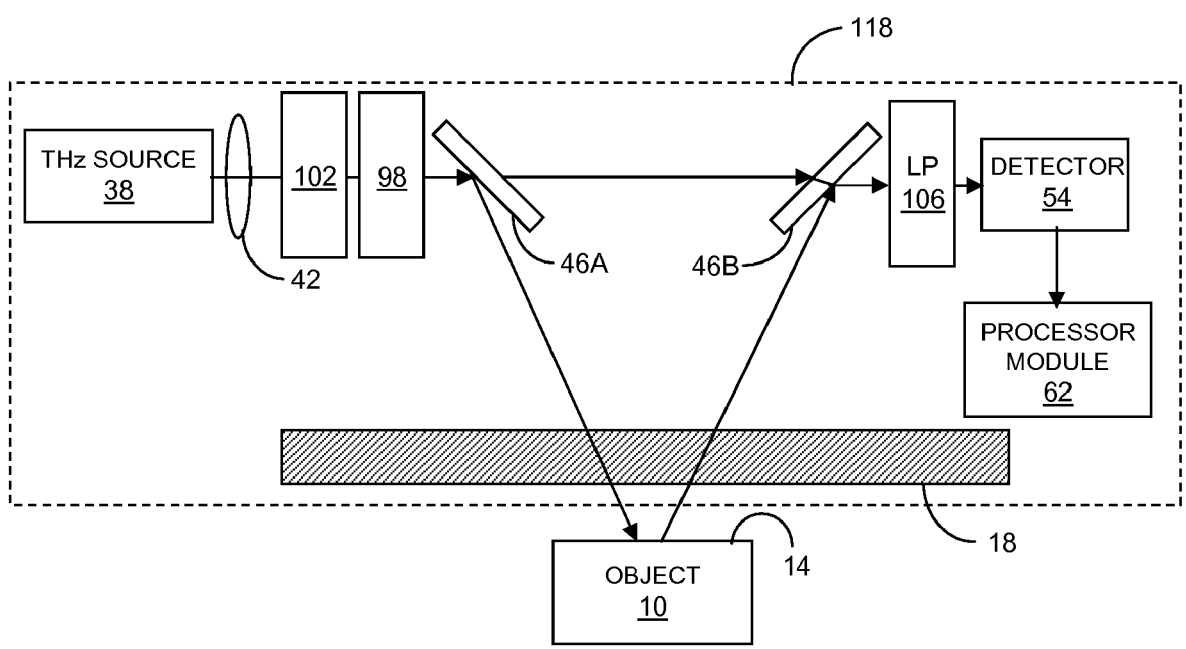
FIG. 11 shows another embodiment of a sensor for measuring a vibration of a surface according to the invention.

Another embodiment of a sensor 118 according to the invention is shown in FIG. 11. The sensor 118 includes components arranged in a Mach-Zehnder interferometer configuration and the beamsplitters 46 can be either nonpolarizing beamsplitters or polarization beamsplitters. A rotating half wave plate 102 and a quarter wave plate 98 are provided between the terahertz source 38 and the splitting beamsplitter 46A, and a linear polarizer 106 is provided between the combining beamsplitter 46B and the detector 54. The terahertz power between the beamsplitter 46 and the linear polarizer 106 is proportional to $1-\cos(2\pi(4f_M-f_v)t+(\phi_1-\phi_2))$ in linear x polarization and $1+\cos(2\pi(4f_M-f_v)t+(\phi_1-\phi_2))$ in linear y polarization. The linear polarizer 106 transmits one of the orthogonal terahertz polarizations. Alternatively, a half wave plate is used in place of the linear polarizer 106 so that the sign of one of the polarization powers is reversed and the components are effectively added at the detector 54. In another embodiment, a polarization beamsplitter replaces the linear polarizer 106 to achieve a physical separation of the combined terahertz beams according to orthogonal polarization components. Each of the separated beams is detected by a terahertz detector and the electrical signal from one of the detectors is subtracted from the electrical signal of the other detector.

While the invention has been shown and described with reference to specific embodiments, it should be understood by those skilled in the art that various changes in form and detail may be made therein without departing from the spirit and scope of the invention.

What is claimed is:

1. A sensor for measuring a vibration of a surface obscured from view comprising:
   a narrowband source of a terahertz beam;
   a beamsplitter to split the terahertz beam into a sample beam to be transmitted through an obscuration in a forward direction to irradiate an obscured surface and a reference beam;
   a beam combiner to combine the sample beam scattered from the obscured surface after propagation through the obscuration in a reverse direction and the reference beam; and
   a terahertz detector to receive the combined sample beam and reference beam, the terahertz detector generating an electrical signal responsive to a vibration of the obscured surface based on a modulation of a power of the combined sample beam and reference beam.

2. The sensor of claim 1 wherein the narrowband source, the beamsplitter and the beam combiner are arranged in a Mach-Zehnder interferometer configuration.

3. The sensor of claim 1 further comprising a mirror to reflect the reference beam to the beam combiner.

4. The sensor of claim 3 wherein the narrowband source, the beamsplitter, the mirror and the beam combiner are arranged in a Michelson interferometer configuration.

5. The sensor of claim 3 further comprising a stabilization module in communication with the terahertz detector and the mirror, the stabilization module controlling a position of the mirror to bias an optical path difference between the sample beam and the reference beam at a quadrature point.

6. The sensor of claim 1 wherein the beamsplitter and the beam combiner are integrated as a single optical component.

7. The sensor of claim 1 further comprising a beamforming module to receive the terahertz radiation from the narrowband source and provide a collimated beam of terahertz radiation.

8. The sensor of claim 1 further comprising a sensor platform to which the narrowband source, the beamsplitter, the beam combiner and the terahertz detector are mounted.

9. The sensor of claim 8 further comprising a contact vibrometer mounted to the sensor platform.

10. The sensor of claim 8 further comprising a barrier vibration sensor mounted to the sensor platform.

11. The sensor of claim 1 further comprising a processor module in communication with the terahertz detector, the processor module producing an electrical signal indicative of a displacement of the obscured surface.

12. The sensor of claim 1 further comprising a terahertz frequency shifter disposed in a path of one of the sample beam and the reference beam.

13. The sensor of claim 12 wherein the terahertz frequency shifter comprises at least one of a rotating half wave plate, a rotating quarter wave plate and a rotating Dove prism.

14. The sensor of claim 1 further comprising a phase shifter disposed in a path of one of the sample beam and the reference beam.

15. A sensor for measuring a vibration of a surface obscured from view comprising:
    a narrowband source of a terahertz beam;
    a beamsplitter to split the terahertz beam into a sample beam to be transmitted through an obscuration in a forward direction to irradiate an obscured surface and a reference beam;
    a beam combiner to combine the sample beam scattered from the obscured surface after propagation through the obscuration in a reverse direction and the reference beam;
    a terahertz frequency shifter disposed in a path of one of the sample beam and the reference beam;
    a terahertz detector to receive the combined sample beam and reference beam, the terahertz detector generating an electrical signal responsive to a vibration of the obscured surface based on a modulation of a power of the combined sample beam and reference beam, the electrical signal having an offset frequency according to a frequency shift imparted by the terahertz frequency shifter; and
    a processor module in communication with the terahertz detector, the processor module producing an electrical signal indicative of a displacement of the obscured surface in response to the electrical signal generated by the terahertz detector.

16. A method for measuring a vibration of a surface obscured from view, the method comprising:

splitting a terahertz beam into a sample beam for irradiating an obscured surface and a reference beam;

propagating the sample beam through an obscuration in a forward direction to irradiate the obscured surface;

combining the reference beam and the sample beam after scattering from the obscured surface and propagation through the obscuration in a reverse direction;

generating an electrical signal responsive to the vibration of the surface based on a modulation of a power of the combined reference beam and sample beam; and demodulating the electrical signal to generate a signal indicative of a characteristic of the vibration of the surface.

17. The method of claim 16 further comprising frequency shifting at least one of the sample beam and the reference beam, and wherein the electrical signal has an offset frequency based on the at least one frequency shift.

* * * * *

UNITED STATES PATENT AND TRADEMARK OFFICE
CERTIFICATE OF CORRECTION

PATENT NO. : 7,564,567 B2  
APPLICATION NO. : 11/626966  
DATED : July 21, 2009  
INVENTOR(S) : Chen et al.

Page 1 of 1

It is certified that error appears in the above-identified patent and that said Letters Patent is hereby corrected as shown below:

In column 1, delete the entire paragraph that starts at line 14 and ends at line 17.

In column 1, insert the following paragraph at line 14:

--This invention was made with government support under grant number FA8721-05-C-0002 awarded by the Air Force. The government has certain rights in this invention.--.

Signed and Sealed this
Fifth Day of April, 2011

David J. Kappos
*Director of the United States Patent and Trademark Office*